United States Patent
Grunsted et al.

(10) Patent No.: US 6,192,123 B1
(45) Date of Patent: *Feb. 20, 2001

(54) METHOD AND APPARATUS FOR INITIATING TELEPHONE CALLS USING A DATA NETWORK

(75) Inventors: David P. Grunsted, Novi, MI (US); Christopher C. Krebs; Bruce A. Botkin, both of Bellevue, NE (US); Daniel L. Kemp, Omaha, NE (US); Kevin Dohrmann, Whitmore Lake, MI (US)

(73) Assignee: National Tech Team Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/833,225

(22) Filed: Apr. 14, 1997

(51) Int. Cl.$^7$ .................................................... H04M 3/42
(52) U.S. Cl. .................... 379/350; 379/93.17; 379/201
(58) Field of Search .............................. 379/90.01, 93.01, 379/93.17, 127, 142, 201, 245, 251, 350, 352, 355

(56) References Cited

U.S. PATENT DOCUMENTS

| 5,850,433 | * | 12/1998 | Rondeau | 379/201 |
| 5,867,495 | * | 2/1999 | Elliot et al. | 379/90.01 |
| 5,907,547 | * | 5/1999 | Folodare et al. | 379/309 X |

* cited by examiner

Primary Examiner—Scott L. Weaver
(74) Attorney, Agent, or Firm—Finnegan, Henderson, Farabow, Garrett & Dunner, L.L.P.

(57) ABSTRACT

In accordance with the present invention a process for initiating a telephone call, comprises the steps, performed by a processor, of: receiving a network request identifying a telephone number and an account number; retrieving from the database a telephone number associated with the account number; and signaling a telephone switch to place a call connecting instruments corresponding to the telephone number from the request and the telephone number retrieved from the database.

8 Claims, 11 Drawing Sheets

METHOD AND APPARATUS FOR INITIATING TELEPHONE CALLS USING A DATA NETWORK

BACKGROUND OF THE INVENTION

A. Field of the Invention

This invention generally relates to systems for making telephone calls and, more particularly, to a method and apparatus for initiating telephone calls on a telephone network in response to requests from a data network.

B. Description of the Related Art

The Internet, fueled by the phenomenal popularity of the World Wide Web (WWW or Web), has exhibited exponential growth over the past few years. Recent surveys estimate that the number of users exceeds 30 million and that the growth continues.

One reason for this incredible growth is that it is easy for users to access the Internet. They need only standard computer equipment, such as a home personal computer with a display and modem, and an Internet connection. Several types of Internet connections are available, including connections through Internet Service Providers (ISPs). To use an Internet connection from an ISP, for example, the user dials into a computer at the ISP's facility using the modem and a standard telephone line. The ISP's computer in turn provides the user with access to the Internet. Communication on the Internet uses the TCP/IP protocol.

Through this Internet connection, the user accesses information on the Web using a computer program called a "Web browser," such as the Netscape Navigator™ from Netscape Communications Corporation. To accomplish this, the user gives the Web browser a Uniform Resource Locator (URL) for an object on the Internet, for example, a document containing information of interest. The document is referred to as a "Web page," and the information contained in the Web page is called "content." Web pages often refer to other Web pages using "hypertext link" or "hyperlinks" that include words or phrases representing the other pages in a form that gives the browser a URL for the corresponding Web page when a user selects a hyperlink. Hyperlinks are made possible by building Web pages using the Hypertext Markup Language (HTML).

The URL identifies a specific computer on the Internet, called a "Web Server," and, more particularly, the location of a Web page located on the Web Server. The Web browser retrieves the Web page and displays it for the user.

With such a large number of existing users, and the estimates that the number continues to grow at a high rate, companies are investing significant resources to develop ways of using the Internet to better service old customers and attract new ones. For example, it is not unusual to find information on available products included in a company's Web pages.

Some companies also distribute information through the Internet. This can be done, for example, using email or Web pages. Newsgroups send email on current events to participants, and newspaper publishers, such as The Wall Street Journal, have digital versions of newspapers available on the Web.

When customers have questions concerning products and services marketed on the Web, they contact the company by, for example, sending an email message or calling a toll free telephone number to speak with a company representative. A significant benefit of product marketing on the Web is the speed in which a company can process orders. However, this benefit is lost when companies are unable to respond immediately to questions from potential customers.

Email can contribute to such a delay because traffic on the Internet can prevent email messages from reaching their destinations for as long as several hours or even days. Furthermore, email is not reliable, messages are often dropped or corrupted in transit. Email can also be used for product orders but concerns over the security of sending information like credit card numbers over the Internet have, to date, stifled the growth in this area.

In the case of a toll free call, customers often wait on the line before a company representative is available. There is thus a need for a convenient method whereby customers can obtain fast and reliable service in a manner that eliminates the long wait-time often associated with email and toll free calls.

Although the Internet was originally designed for data transmission, it is now a host for voice transmissions as well. For example, audio interface software like NetPhone from Electric Magic Company enables phone-like connections over the Internet. NetPhone operates by compressing audio and sending it over a TCP/IP connection as digital information. According to Electric Magic, NetPhone interfaces with Netscape, allows multiple active calls, and provides caller ID service. The major advantage of this type of technology is that it permits users to make telephone calls that bypass telephone companies and their charges for calls.

The Internet, however, is designed for data transmission, not voice. Thus, the quality of voice transmission on the Internet is typically not very good.

The ability to communicate easily may be the underlying reason for the Internet's enormous success. But not all communications schemes have enjoyed the same kind of success.

For example, telephone conferencing, where at least three parties in different locations are included in a single telephone conversation, has been available for many years. At first, the telephone company provided conferencing as a service for a fee. In this case, the customer provided the telephone numbers for those to be included in a conference call, and the company connected the conference call. Later, conference calling became a feature of PBX systems, which are typically used by larger organizations with many phones.

Additionally, some people repeatedly make conference calls to the same group. This means that they have to go through the same routine with a telephone company (i.e., specifying the same telephone numbers for the call) each time they wish to make a conference call. Alternatively, companies can provide an added service of storing this information. The typical PBX system does not provide such a storage feature or eliminate the need for the user to dial each telephone number for the group every time he wishes to make a conference call.

Those skilled in the art will recognize, however, that it would be more desirable to give the user greater control and flexibility over conference calling.

SUMMARY OF THE INVENTION

Systems consistent with the present invention, as embodied and broadly described herein, overcome the limitations due to the prior art by integrating equipment of existing telephone companies with the Internet to provide enhanced telephone services on a public switched telephone network via requests from the Internet. In accordance with the present invention, a process for initiating a telephone call, comprises the steps, performed by a processor, of: receiving a network request identifying a telephone number and an account number; retrieving from the database a telephone number associated with the account number; and signaling a telephone switch to place a call connecting instruments corresponding to the telephone number from the request and the telephone number retrieved from the database.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers and telephone switching equipment. The architecture for and procedures to implement this invention, however, are not conventional, because they provide enhanced telephone services on a system that blends features of the Internet with a public switched telephone network.

A. Overview

Systems consistent with the present invention provide enhanced telephone services through the Internet by connecting a telephone service system to the Internet. The telephone service system includes a computer server and a telephone switch. Users access the server to request enhanced telephone services such as immediate-response customer service calling (referred to as the "call me now" function) and conferencing. The server then signals the telephone switch to make calls on a public switched telephone network in accordance with the user requests.

B. Telephone Service System

Figure 1:
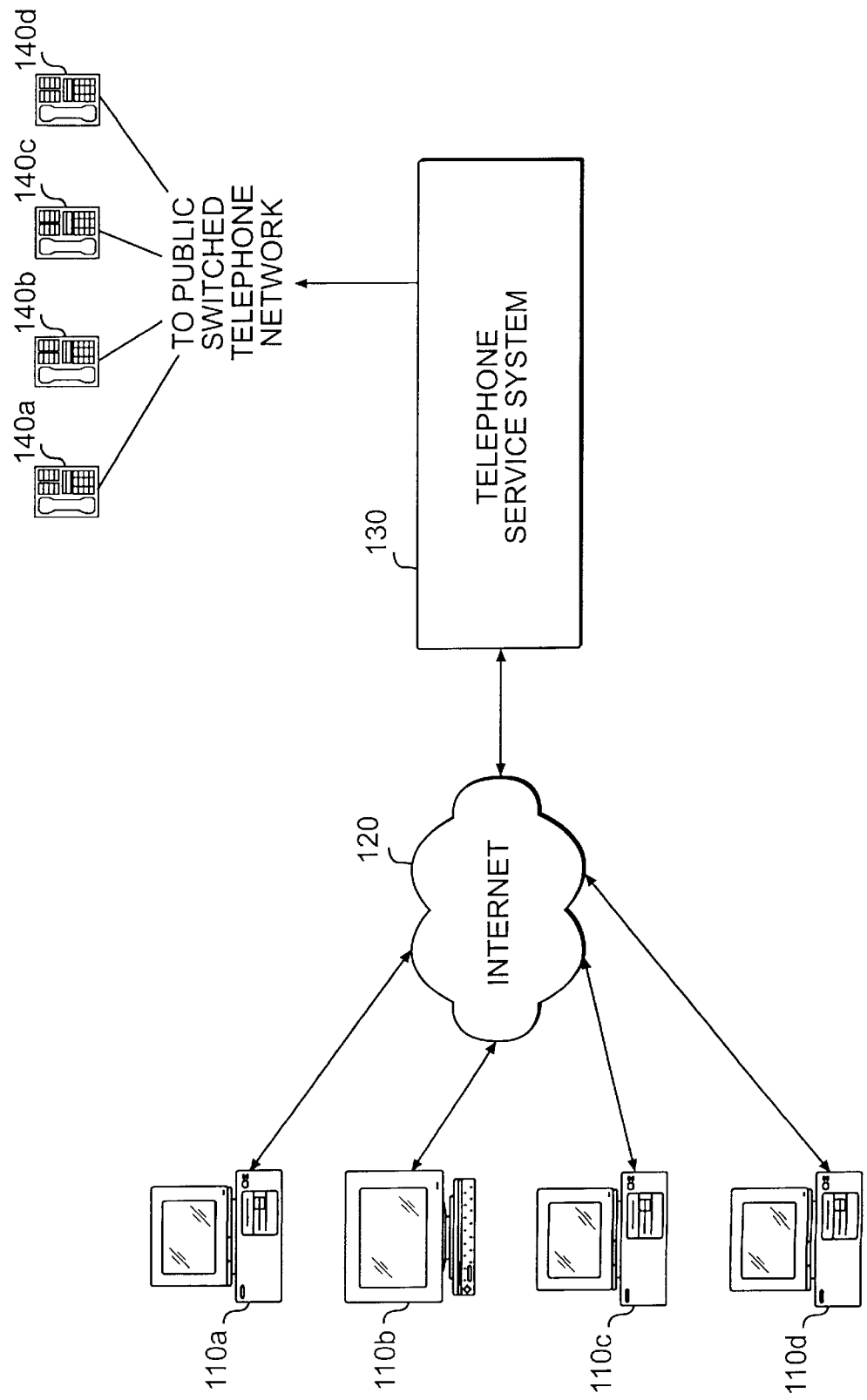
FIG. 1 is a block diagram of an exemplary architecture for a telephone service system consistent with the present invention.

As illustrated in FIG. 1, multiple computers 110a, 110b, 110c, and 110d are connected to the Internet, 120. Although FIG. 1 shows only four computers, 110a through 110d, connected to the Internet, 120, those skilled in the art will recognize that the number of computers that can be connected to the Internet is potentially unlimited.

A telephone service system 130 connects the Internet to a public switched telephone network that in turn connects multiple telephones 140a through 140d. System 130 implements the Internet-based enhanced telephone services according to the present invention. In general, Internet users on computers 110 transmit service requests over the Internet to system 130 that in turn processes the requests accordingly. Service requests include the "call me now" function and other customer services like direct calling, phone book management, and conferencing.

Figure 2:
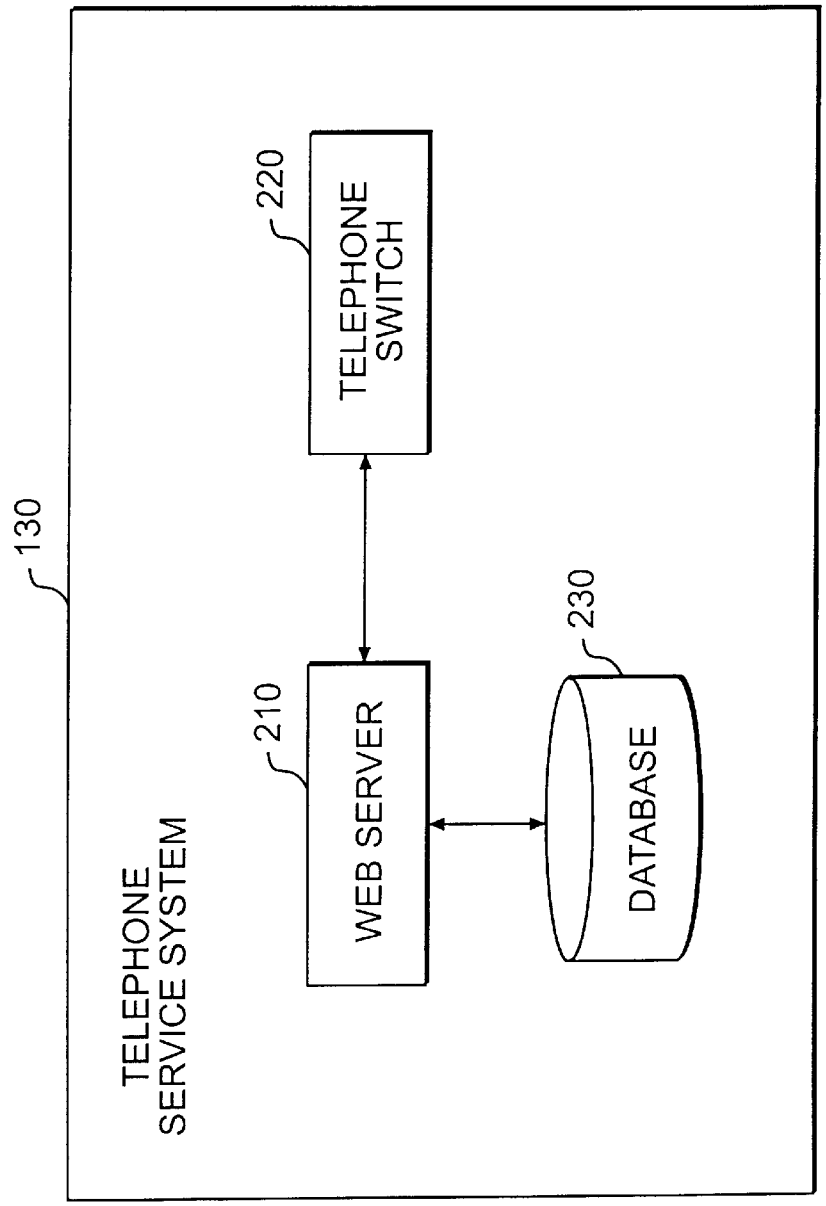
FIG. 2 is a block diagram of the components of a telephone service system consistent with the present invention.

FIG. 2 is a block diagram of the components of telephone service system 130. System 130 includes a web server 210, a telephone switch 220, and a database 230. Web server 210 and switch 220 may be conventional hardware. Acceptable server computers include IBM compatible machines with Windows 95® operating system, or conventional workstations, and the Sparcstation® manufactured by Sun Microsystems Corp. and the Solaris® operating system. Telephone switch 220 may be, for example, model VCO80, manufactured by Suma Four Inc.

The present invention uses a public switched telephone network operated by Sprint, though other voice-based networks may be used.

Web server 210 includes a number of software modules, preferably written in the C++ programming language, that implement requests for telephone services. Server 210 uses information stored in database 230 to implement enhanced telephone services in a manner consistent with the present invention. Database 230 includes customer account information, such as a customer's account number, telephone number, and billing information. Database 230 also includes customer-specified information such as phone lists and conference call groups. Most conventional database management systems, such as Sybase and Oracle, may be used to manage database 230 and to implement instructions associated with modifying and accessing database 230.

Figure 3:
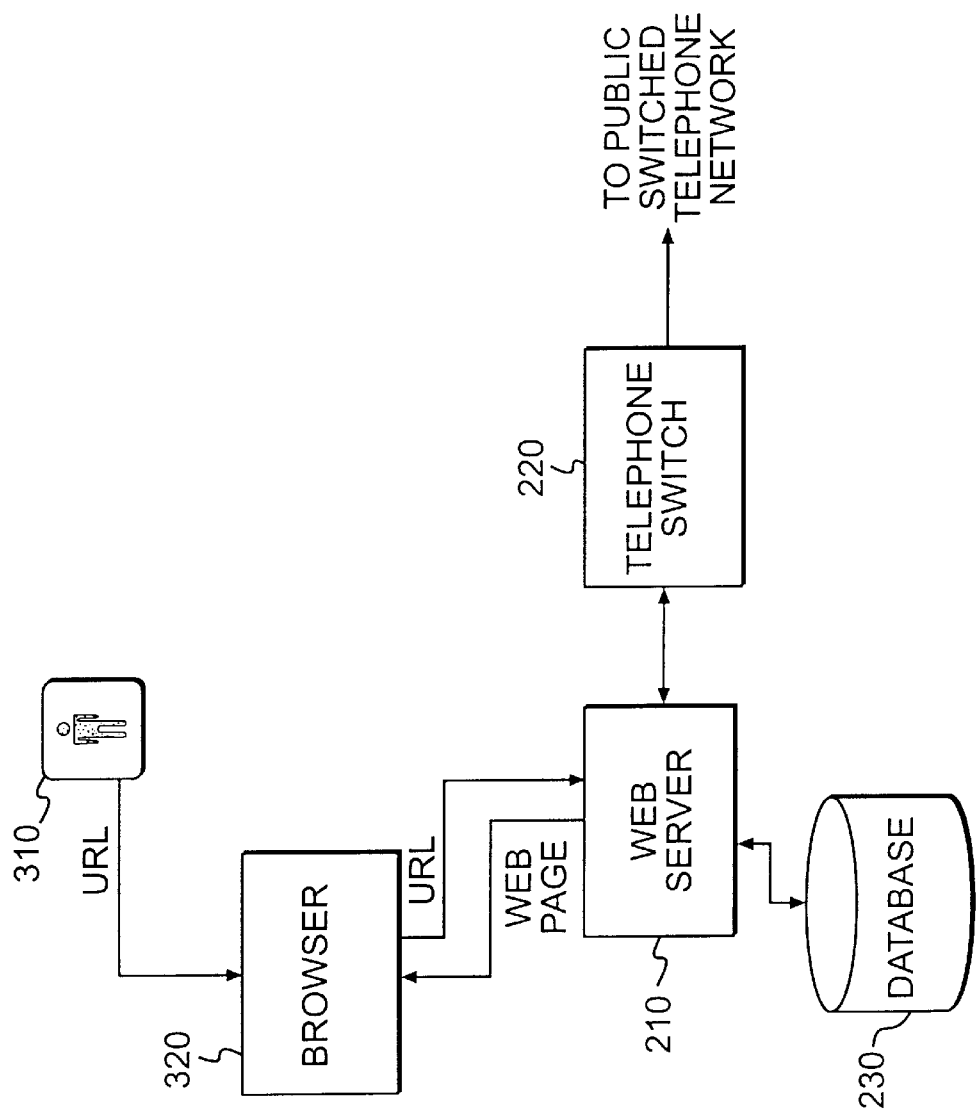
FIG. 3 is an operation flow diagram used to explain the operation of a telephone service system consistent with the present invention.

Communication with web server 210 is performed in the typical way used for most Internet communications. As illustrated in FIG. 3 for example, a user 310 transmits a uniform resource locator (URL) to the Internet using a web browser 320 installed on a computer with an Internet connection. Web server 210 then transmits a selected web page for the browser 320 to display. Web server 210 accesses database 230 and instructs telephone switch 220 as needed to process requests from user 310.

For purposes of this description, a "user" is one who initiates a call. If the "user" pays for the call then he is also referred to as a "customer." Thus, all customers are considered users but not all users are customers. This permits customers like companies marketing products and services on the Internet to provide users with access to the "call me now" function (described in detail below). Customers also have access to other enhanced telephone services, as described below.

D. Enhanced Telephone Services

Systems consistent with the present invention provide a variety a enhanced telephone services that take advantage of the Internet connection provided by system 130. Before permitting a customer to use these services, either directly for calls or indirectly for the "call me now" function, web server 210 requires that all customers establish an account. When doing so, a customer is assigned a unique account number. To establish an account, a customer must also provide billing information, such as an address and a credit card number, that can be used to bill the customer for services. Although the billing information is preferably stored in database 230, the scope of the present invention envisions the use of other configurations including, for example, a separate billing database for customer billing information.

Customers may also select passwords when establishing new accounts, and the passwords can be changed at any time upon request. The passwords are stored in database 230.

(1) "Call Me Now" Function

Users select this function when they wish to place a call to a specific telephone number immediately. This permits companies marketing products and services on the Internet to include on their web pages a button or other indicator that users can select to make an immediate call to the company to speak with a representative. For example, a catalog company may offer a particular article of clothing by displaying an image of the article on a web page. When a user (who may also be considered a customer of the catalog company) has a question about that article, he can select the "call me now" button on the company's web page to speak immediately with a company representative.

Figure 4:
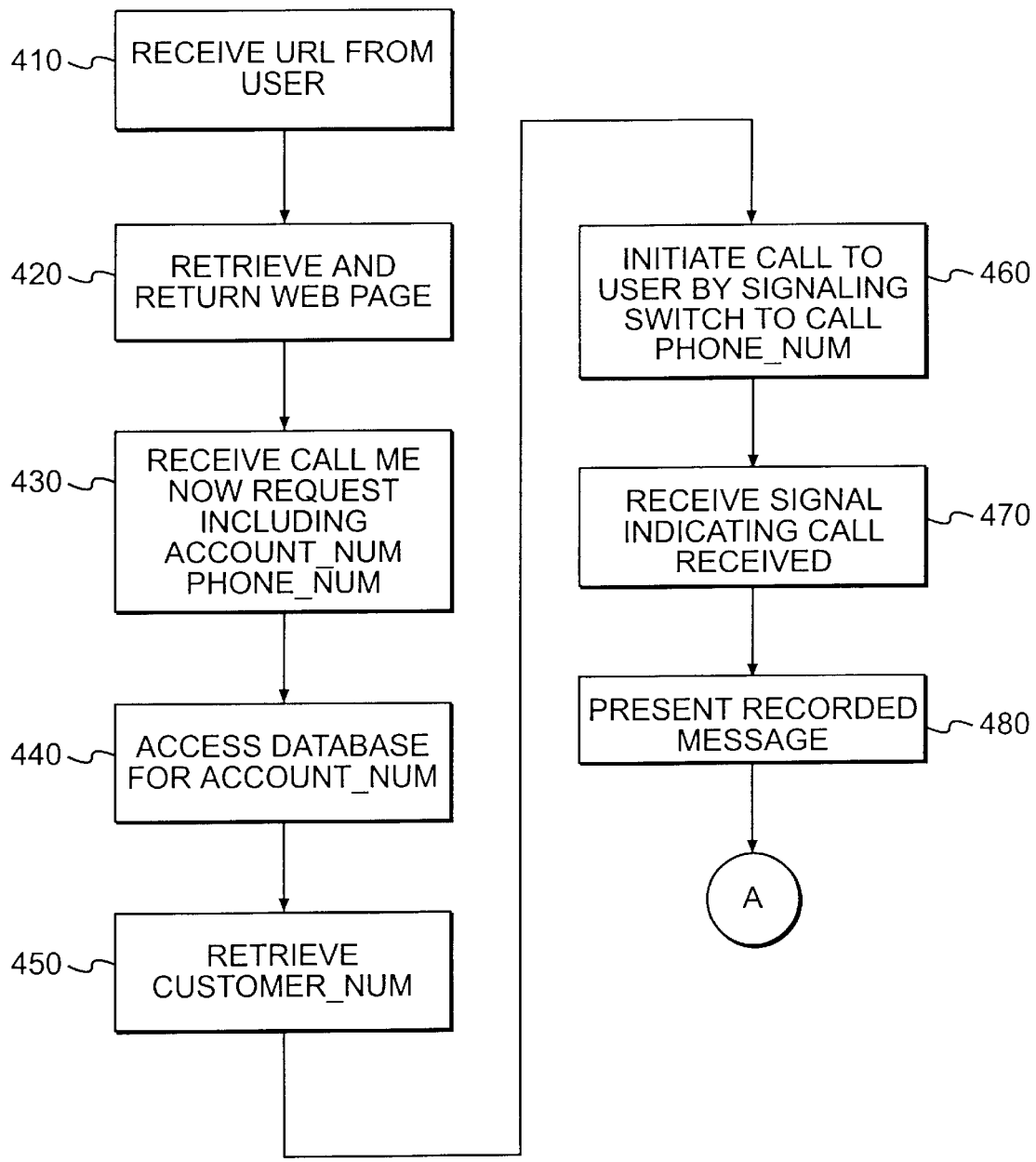
FIGS. 4 and 5 is a flow chart of the steps performed by the telephone service system to process a "call me now" request in a manner consistent with the present invention.
Figure 5:
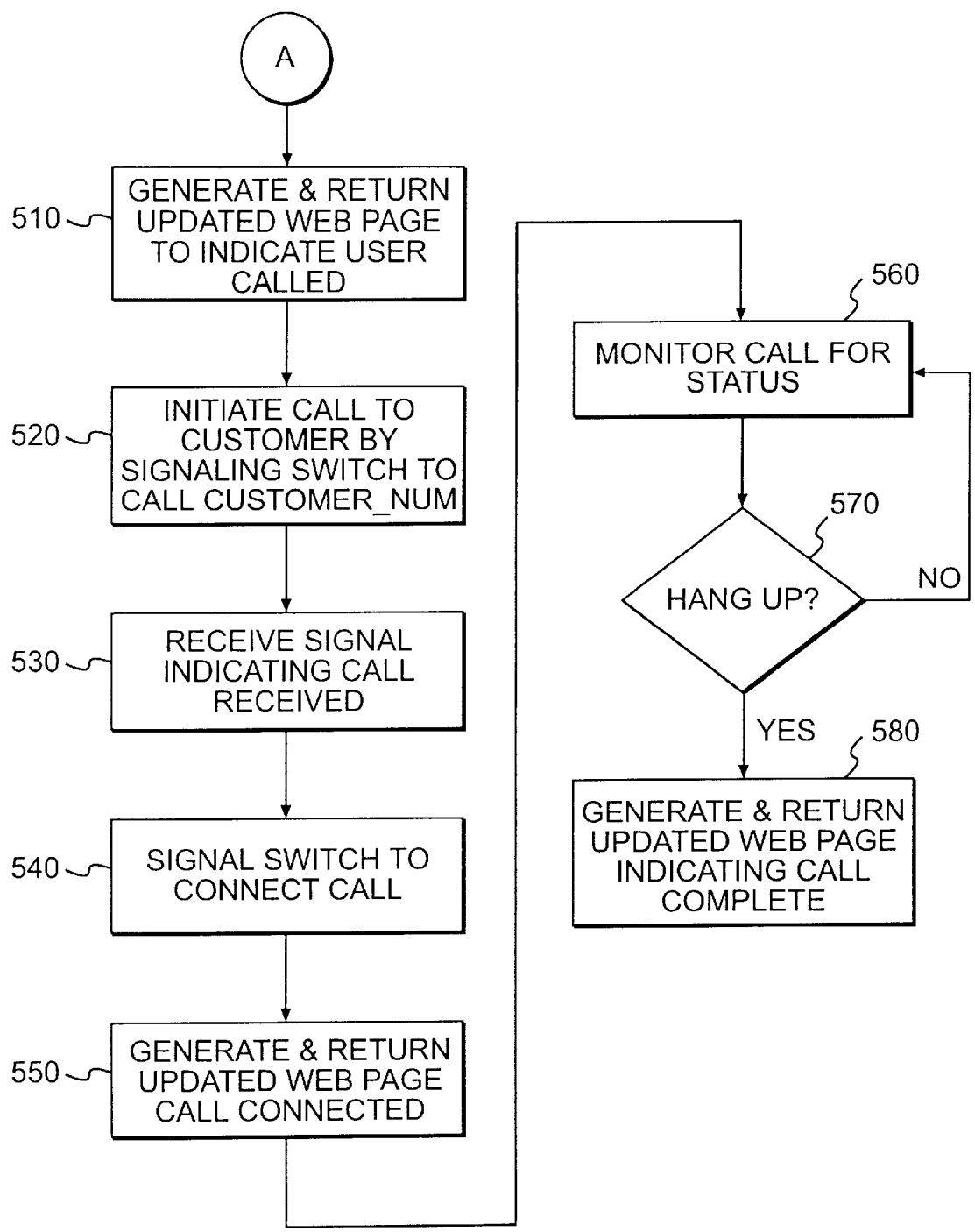

FIGS. 4 and 5 include a flow chart of the steps performed by web server 210 for the "call me now" function. For this explanation it is assumed that the customer has already established an account and included a "call me now" button on its web page. Thus, when users select the button, using conventional techniques associated with a web browser (for example, pointing to a selection displayed on a web page with a mouse pointer and clicking on a mouse button), a URL for web server 210 is transmitted along with an account number that should correspond to a customer account number stored in database 230.

After a user selects a customer's "call me now" button, web server 210 receives the URL and a customer account number (step 410), and retrieves a stored web page for the customer and transmits the web page to the user (step 420). The user's browser then displays the web page. In this way customers can have unique web pages for this telephone service or use a default page provided by the system. The web page typically includes a field for the user to input the number of a telephone where he can be reached ("PHONE_NUM" ).

After the user inputs the telephone number, the "call me now" request is complete. The user then instructs browser 320 to transmit the request to web server 210. When a complete "call me now" request (including an account number ("ACCOUNT_NUM) and phone number ("PHONE_NUM")) is received (step 430), web server 210 accesses database 230 to verify that the received account number corresponds to a stored customer account number (step 440), and retrieves from database 230 a telephone number for the customer ("CUSTOMER_NUM") (step 450).

Web server 210 then initiates a call to the user's input telephone number (step 460). This step involves signaling telephone switch 220 to make to the call. Telephone switch 220 notifies web server 210 when the user is on the line (step 470), e.g., the user picked up the handset of the telephone, so web server 230 can play a recorded message selected by the customer (step 480). For example, the message may say "PLEASE HOLD WHILE WE CONNECT YOU TO A CUSTOMER REPRESENTATIVE." Web server 210 also generates a new web page to indicate that the user is on the line and transmits the new page to the user's browser (step 510).

Web server 210 then initiates a call to the customer's telephone number by signaling telephone switch 220 to make the call (step 520). Once web server 210 receives confirmation from telephone switch 220 that the customer is on the line (step 530), web server 210 sends a signal to connect the call between the user and the customer (step 540). Web server 210 then generates a new web page to indicate that both the user and the customer are on the line and connected, and transmits the new page to the user's browser (step 550).

Web server 210 also monitors call status for changes (step 560). This is done by receiving signals from telephone switch 220 on the connection between the user and the customer. If there is a change in the connection, for example, a party hangs up or otherwise ends the call (step 570), web server 210 generates a new web page to indicate the change, and transmits the new page to the user's browser (step 580). In this example, when a party hangs up the call is complete and, thus, the web page transmitted to the user indicates that the call is complete.

(2) Customer Services

The "call me now" function is only one customer service provided by telephone service system 130. System 130 also permits customers to make telephone calls, store/modify phone books, make conference calls, and store/modify conference call groups, i.e., multiple telephone numbers for frequent conference calls. When a customer seeks to use any of these services, he enters the URL for web server 210 into a web browser on a computer connected to the Internet. When web server 210 receives the URL (step 610), it retrieves and transmits to the browser a web page for the customer to log in to the system (step 615). The customer uses the web page to input an account number ("ACCOUNT_NUM") and password (or personal identification number, "PIN") and transmits this information to web server 210. When the customer's login information is received (step 620), web server 210 accesses database 230 to verify the account number and password (step 630). If verification is not approved, i.e., the login information is incorrect or incomplete, the process returns to step 615 for the user to try again. Otherwise, web server 210 retrieves a web page indicating that the login has been verified, accesses database 230 for customer preferences, such as a stored telephone number for the customer and the customer's phone book (including conference call groups), transmits the web page verifying the login to the customer along with a listing of the available phone services (step 635). Web server 210 then waits to receive from the customer a service selection (step 640). The service selections include: (1) change the customer's default telephone number (i.e., the number where the system can reach the customer), thus overriding the stored telephone number for the customer (step 645, see FIG. 7), (2) use the stored phone book to, for example, modify an entry in the phone book or make a call to a number stored in the phone book (step 650, see FIGS. 8–10), and (3) make a conference call to a group stored in the phone book (step 655, see FIG. 11). The customer can also select an option to make a call immediately and input the telephone number for the call.

For greater security, however, the login procedure can include a "fire wall." In this configuration, a separate server connected to the Internet may require the user to provide a customer identification and password. Once this customer information is verified against stored information for the customer, the fire wall server permits the customer to access web server 210 and provides the customer's browser with a web page specifying available telephone services. After the customer passes the fire wall server, a secure Internet connection between the customer's browser and web server 210 is established, preventing others from tampering with the connection.

(I) Change Default Telephone Number

Figure 6:
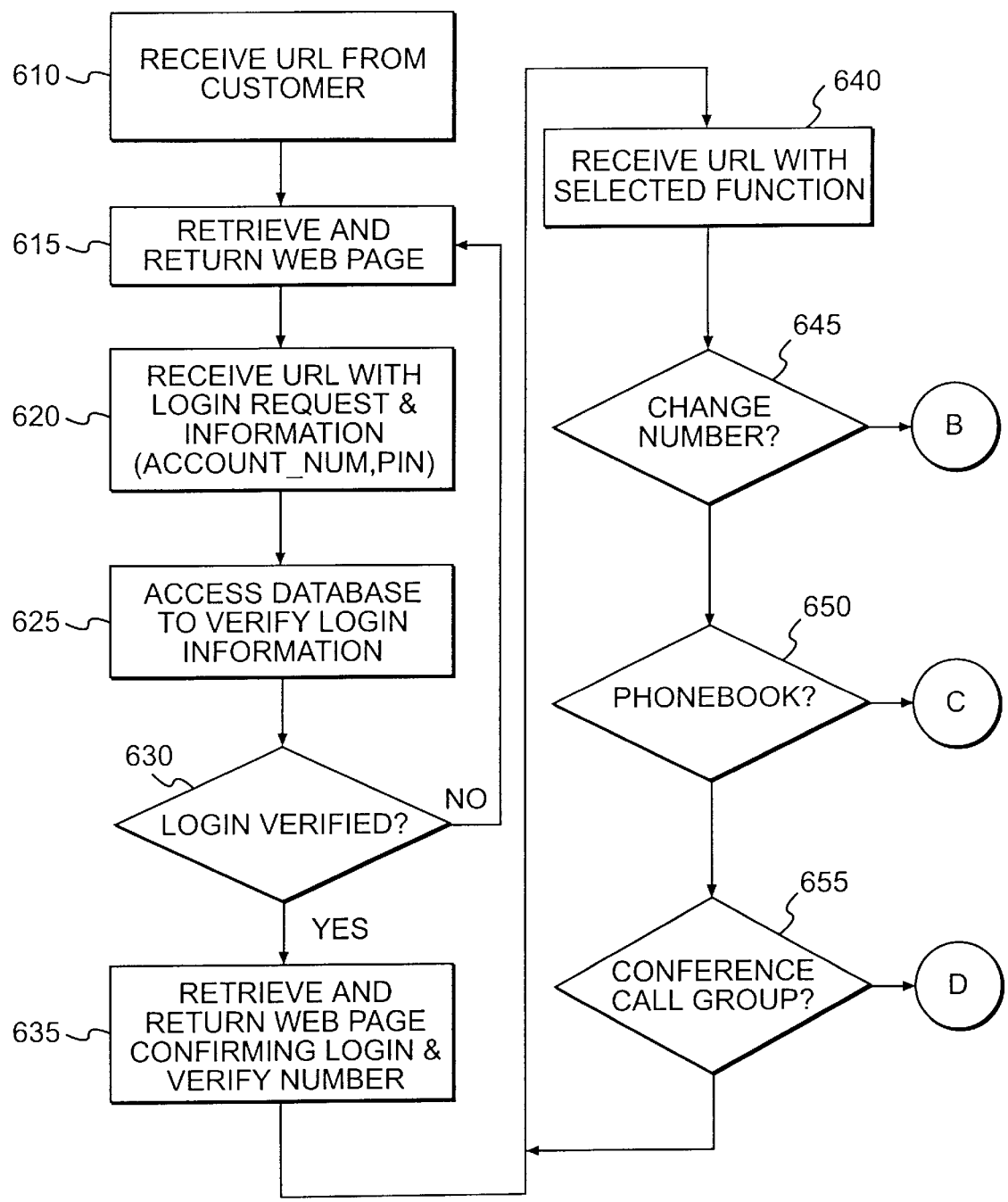
FIGS. 6–11 is a flow chart of the steps performed by the telephone service system to process customer service requests for enhanced telephone services in a manner consistent with the present invention.
Figure 7:
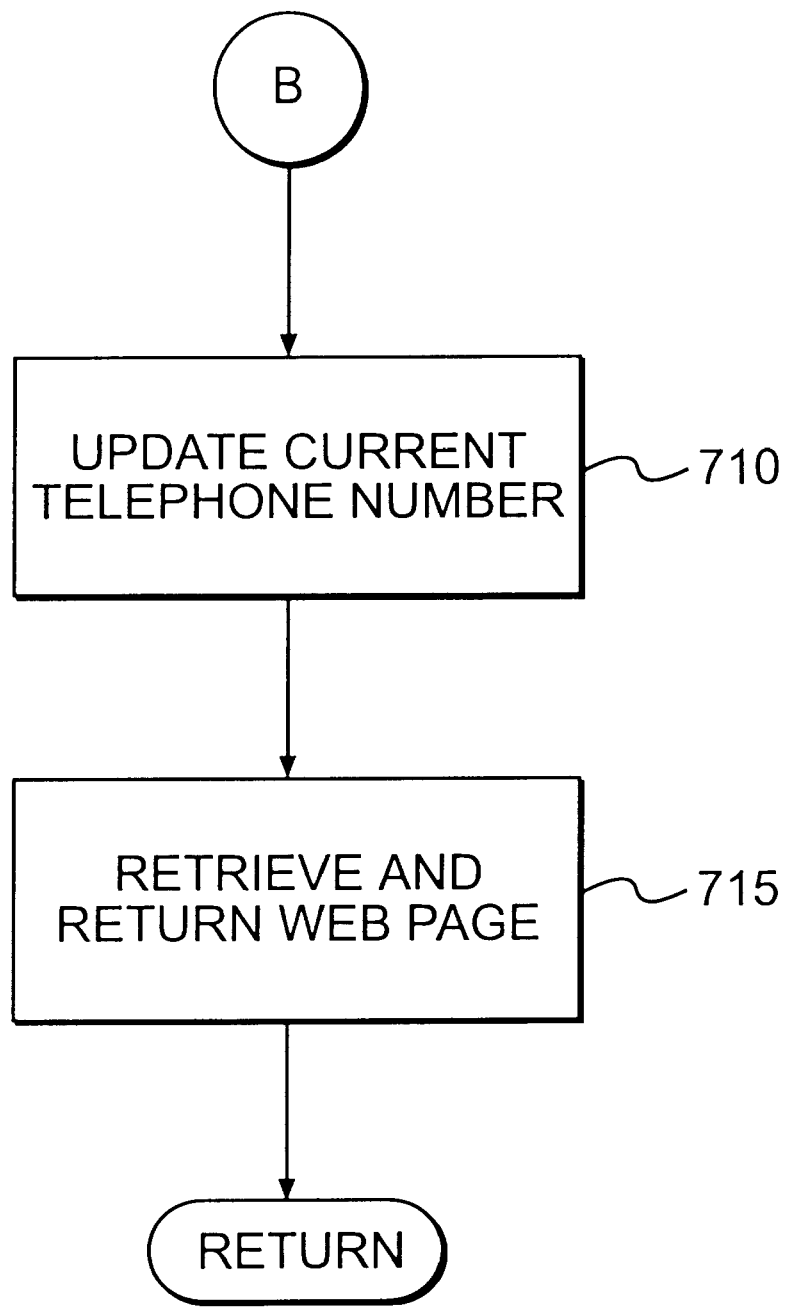

FIG. 7 specifies the steps performed by web server 210 in response to a customer request to change the default telephone number (step 645 of FIG. 6). The web page transmitted in step 635 includes a location for the customer to specify a different default telephone number. When a customer selects this function, he transmits the request along with the new telephone number. This way a customer can use the system 130 from any location where he has access to a telephone.

Server 210 preferably updates database 230 with the new telephone number so that the next time the customer logs in to the system that new number will appear as the default telephone number for the customer (step 710). After updating database 230, web server retrieves and transmits to the customer's browser a web page confirming the change.

Alternatively, web server 210 may store the new telephone is a temporary field of the customer's record in database 230 and use that number only during the current session (i.e., until the customer logs off) to call the customer.

(ii) Phone Book

Figure 8:
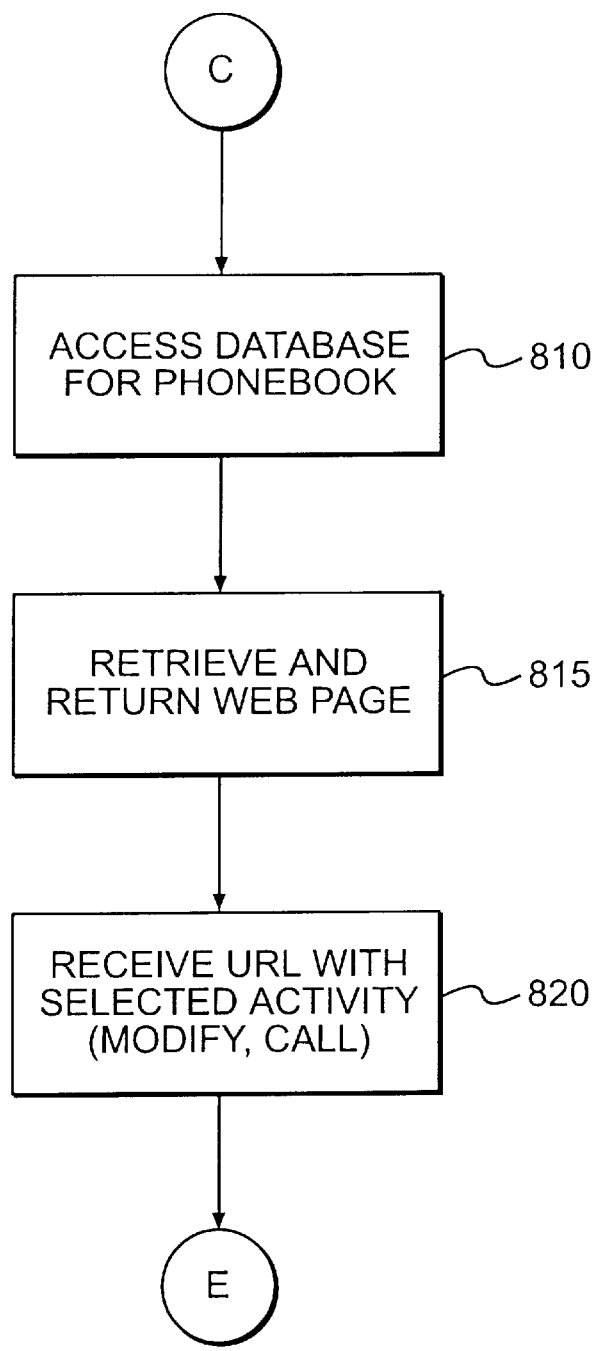
Figure 9:
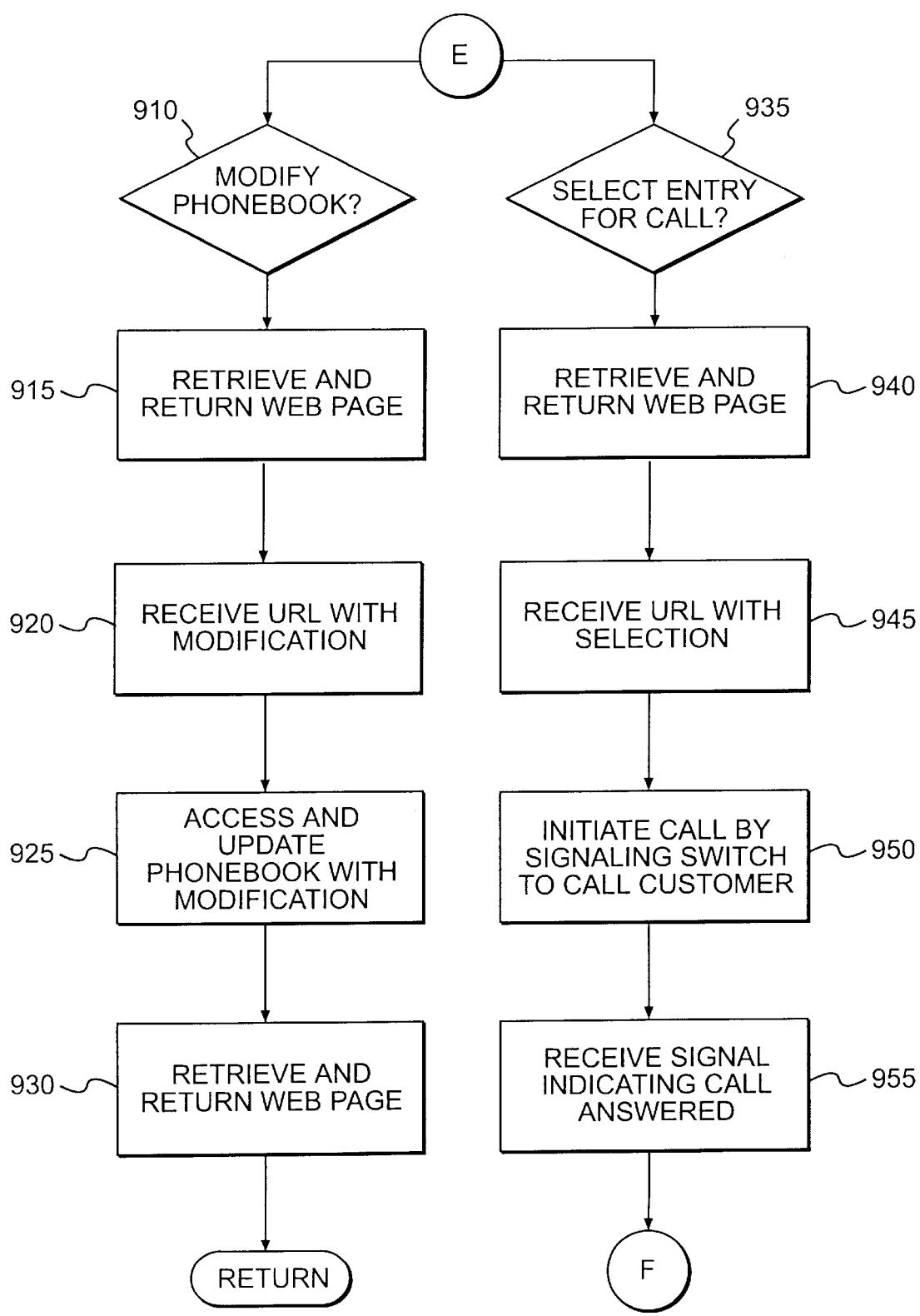
Figure 10:
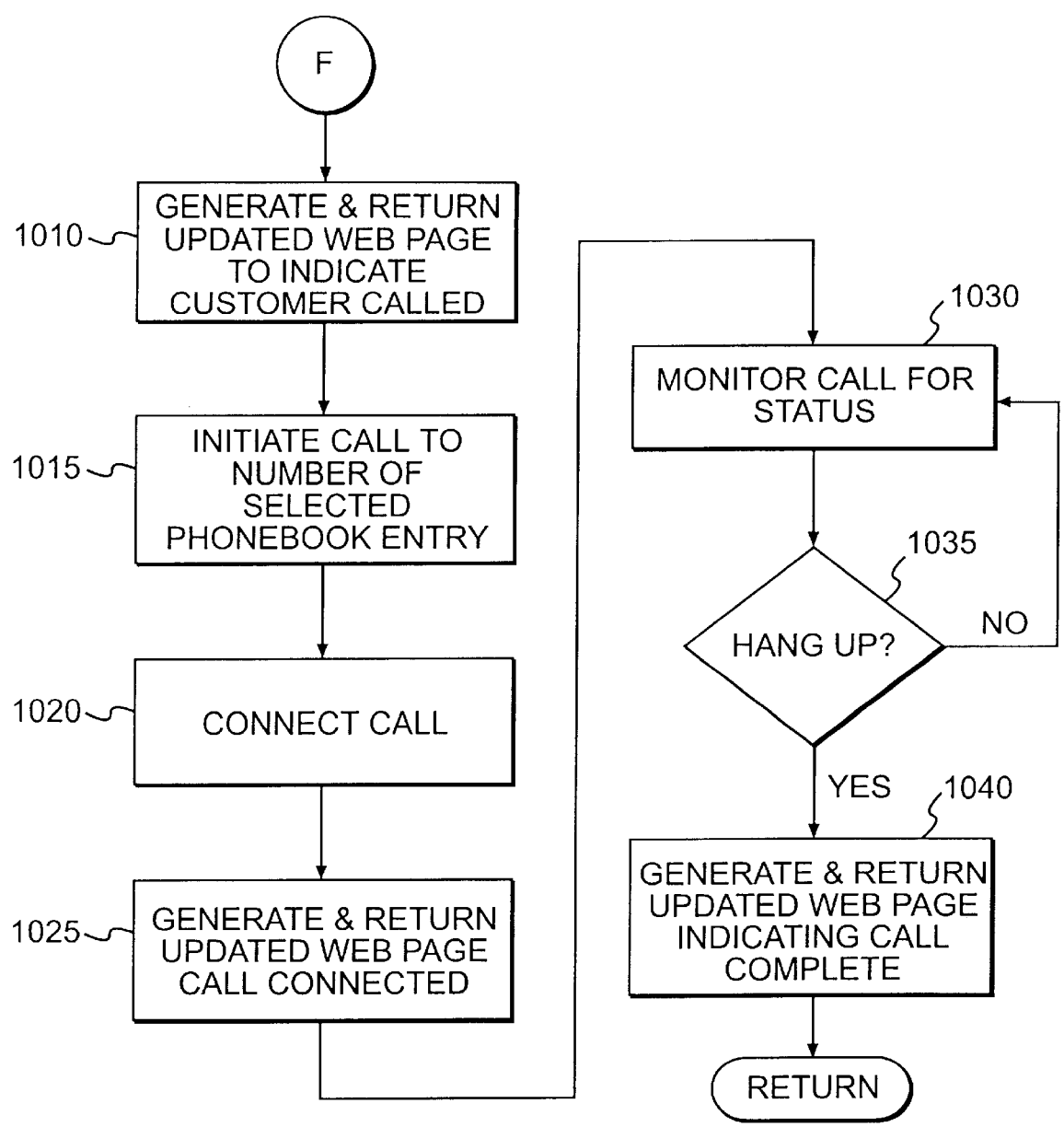

FIGS. 8 to 10 include the steps performed by web server 210 in response to a customer request to use the stored phone book (step 650 of FIG. 6). First, web server 210 accesses database 230 to retrieve the stored information for the customer's phone book (step 810), retrieves a stored web page used to display phone book information, and returns the phone book web page to the customer's browser (step 815). Phone book information includes a list of telephone numbers and names. The phone book web page returned to the customer (step 815) preferably includes an alphabetical list ("A, B, C, . . . , Z"). When a customer selects a letter from the list, web server 210 generates and transmits to the customer a web page including all names in the phone book that begin with the selected letter. Alternatively, web server 210 may simply provide a complete alphabetical listing of all names in the phone book.

According to the preferred implementation database 230 stores the phone books for all customers. To eliminate the storage demands associated with this configuration, the customer's phone book may be stored on the customer's computer and accessed using applets written in the JAVA programming language and included in the phone book web page. Additionally, the system can be configured to use a customer's phone book created and stored using other applications such as ECCO Professional, manufactured by Netmanage Inc.

Web server 210 then waits for the customer to select one of the phone book operations: (1) modify the phone book, or (2) make a call to a person identified in the phone book (step 820).

When the customer selects the option to modify the phone book in database 230 (step 910), web server 210 retrieves and transmits to the customer's browser a web page for this selection. For example, when the customer indicates that he would like to modify an existing entry in the phone book, he may select the entry from the alphabetical listing. In this case, web server 210 would provide in a web page the current information for the selected entry. This way the customer can simply modify the appropriate parts (e.g., change the telephone number) of the entry.

When the customer has completed a modification, he instructs the browser to transmit the phone book modification URL with the modification to web server 210. When web server 210 receives the modification (step 920), web server 210 accesses and updates database 230 accordingly (step 925), and transmits a web page to the customer confirming the modification (step 930). This completes steps involved in modifying entries in the customer's phone book.

A substantially similarly operation is used to delete and add phone book entries.

To make a call to the telephone number of a person identified in a phone book entry, the customer selects this option and notifies web server 210 of the selection (step 820 in FIG. 8 and step 935 in FIG. 9). In response to this selection, web server 210 transmits the appropriate web page to the customer's web browser and waits for the customer to select an entry from the phone book. The process used to select an entry is the same as that described above with respect to the phone book entry modification procedure.

The customer then instructs the browser to transmit the selected phone book entry to web server 210, which is waiting to receive it (step 945). Web server 210 then initiates the call to the customer by signaling telephone switch 220 (step 950). When telephone switch receives a signal indicating that the customer is on the line, it transmits a signal to this effect to web server 210 (step 955).

Continuing in FIG. 10, web server 210 then generates and transmits to the customer's browser a web page indicate that the customer is on the line (step 1010). Next, web server 210 initiates a call to the other party selected from the phone book and using the telephone number from the phone book entry for that party (step 1015). When the other party receives the call, telephone switch 220 sends a signal to web server 210 that, in turn, sends a signal to telephone switch 220 to connect the call (step 1020). Web server 210 then generates and transmits to the customer's browser a web page indicating that both parties are on the call (step 1025).

Web server 210 also monitors call status for changes (step 1030). This is done by receiving signals from telephone switch 220 on the connection between the user and the customer. If there is a change in the connection (step 1035), web server 210 generates a new web page to indicate the change, and transmits the new page to the user's browser (step 1040).

In addition to storing names and telephone numbers in a phone book, web server 210 also permits the customer to select several stored telephone numbers to form a conference call group, which may be a separate entry in the customer's phone book. This way when the customer makes frequent conference calls to the same group he does not have to select the names from the phone book each time. Instead, he only needs to select the group for a conference call.

(iii) Conference Call Group

Figure 11:
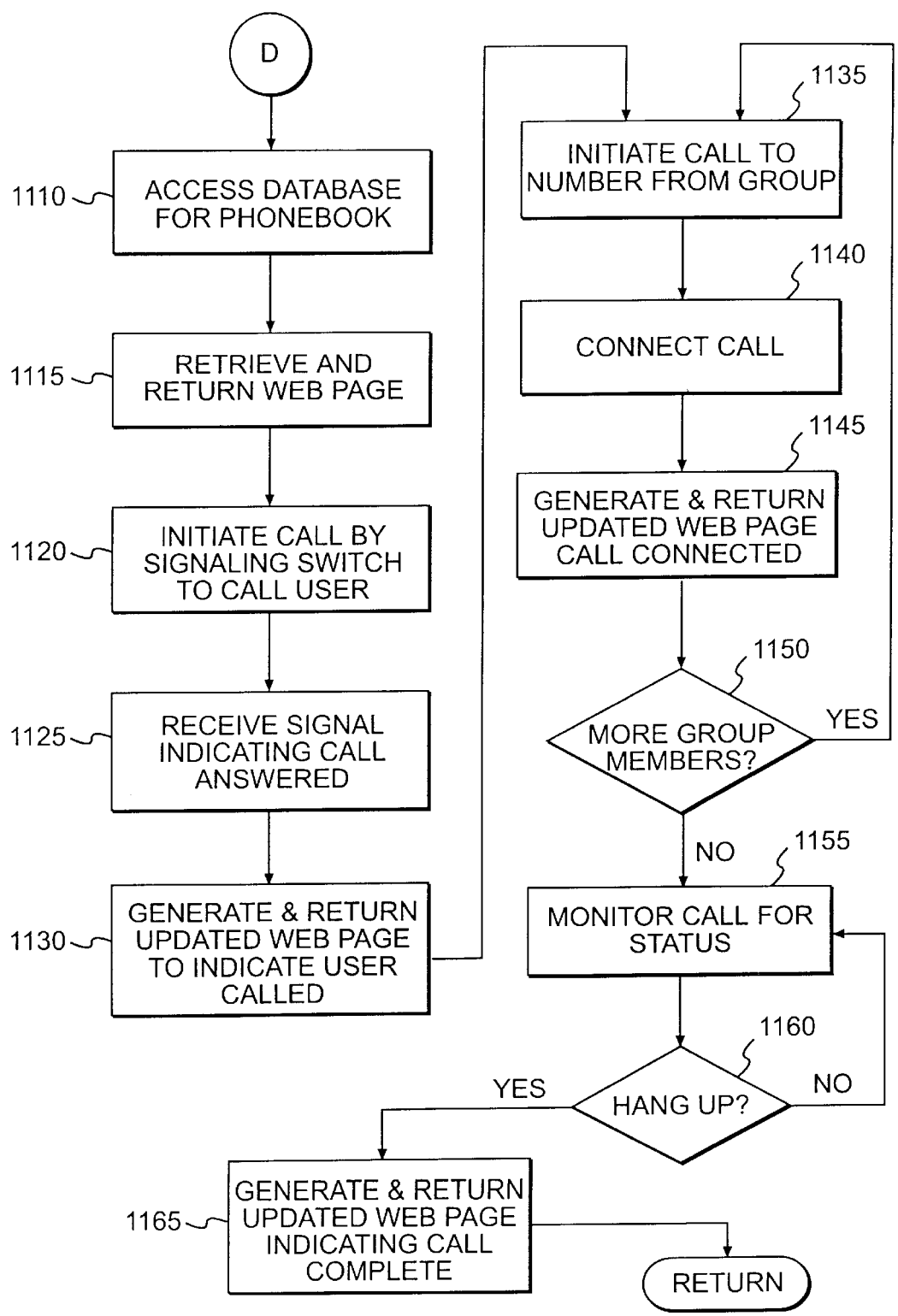

FIG. 11 specifies the steps performed by web server 210 in response to a customer request to make a conference call to a group stored in the phone book (step 655 of FIG. 6).

The first step in this process involves the customer accessing the phone book in the manner described above, selecting the a conference call group, including multiple party entries from the phone book, and transmitting the selection to web server 210 (step 1110). Web server 210 then retrieves and transmits to the customer's browser a web page corresponding to the conference call selection (step 1115). The page may include a listing of the individual parties for the conference call.

Web server 210 initiates the call to the customer by signaling telephone switch 220 (step 1120). When telephone switch 220 receives a signal indicating that the customer is on the line, it transmits a signal to this effect to web server 210 (step 1125). Web server 210 then generates and transmits to the customer's browser a web page indicating that the customer is on the line (step 1130).

Next, web server 210 initiates a call to a first party to the conference call selected from the group (step 1135). When the other party receives the call, telephone switch 220 sends a signal to web server 210 that, in turn, sends a signal to telephone switch 220 to connect the call (step 1140). Web server 210 generates and transmits to the customer's browser a web page indicating that the parties are on the call (step 1145). Web server 210 then determines whether there are additional parties for the conference call (step 1150). If so, web server 210 repeats steps 1135 to 1145 for each party.

Once all of the parties are connected, web server 210 monitors the status of conference calls for changes (step 1155). If there is a change in the connection, for example, a party hangs up (step 1160), web server 210 generates a new web page indicating the change, and transmits the new page to the user's browser (step 1165). If telephone switch 220 signals server 210 that all of the parties to a conference call have hung up, the web page indicates that the call is complete.

F. Conclusion

In accordance with the present invention enhanced telephone services can be LAW OFFICES made available over the Internet. The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for initiating telephone calls on a voice network in response to requests from a data network comprising the steps, performed by a processor, of:

receiving a data network request to initiate a telephone call, including a user telephone number;

identifying a stored telephone number corresponding to the request;

signaling a switch to make a call on the voice network to an instrument identified by the stored telephone number;

monitoring a status of the call; and providing a user with an indication of a change in the status of the call.

2. The method of claim 1, wherein the signaling step includes the substep of:

connecting an instrument identified by the user telephone number to the call.

3. The method of claim 1, wherein the receiving step includes the substeps of:

providing a web page for user input and request selection.

4. The method of claim 1, wherein the identifying step includes the substep of:

accessing a stored database in accordance with the data network request.

5. A system for initiating telephone calls on a voice network in response to requests from a data network comprising:

an input component configured to receive a data network request to initiate a telephone call, including a user telephone number;

a processing component configured to identify a stored telephone number corresponding to the request;

a signaling component configured to signal a switch to make a call on the voice network to an instrument identified by the stored telephone number;

a monitoring component configured to monitor a status of the call; and a status component configured to provide a user with an indication of a change in the status of the call.

6. The system of claim 5, wherein the signaling component includes:

means configured to connect an instrument identified by the user telephone number to the call.

7. The system of claim 5, wherein the input component includes:

means configured to provide a web page for user input and request selection.

8. The system of claim 5, wherein the processing component includes:

an database accessing component configured to access a stored database in accordance with the data network request.

* * * * *